(12) United States Patent
Masghati

(10) Patent No.: US 6,992,874 B2
(45) Date of Patent: Jan. 31, 2006

(54) DUAL STAGE CURRENT LIMITING SURGE PROTECTOR SYSTEM

(75) Inventor: Mohammad Masghati, Carol Stream, IL (US)

(73) Assignee: Illinois Tool Works Inc., Glenview, IL (US)

(*) Notice: Subject to any disclaimer, the term of this patent is extended or adjusted under 35 U.S.C. 154(b) by 107 days.

(21) Appl. No.: 10/679,196

(22) Filed: Oct. 3, 2003

(65) Prior Publication Data

US 2005/0073793 A1 Apr. 7, 2005

(51) Int. Cl.
*H02H 1/00* (2006.01)

(52) U.S. Cl. ...................................... 361/119
(58) Field of Classification Search ................ 361/117, 361/118, 119, 120, 111, 124, 126, 127
See application file for complete search history.

(56) References Cited

U.S. PATENT DOCUMENTS

| | | | | |
|---|---|---|---|---|
| 4,587,588 A | 5/1986 | Goldstein | | 361/54 |
| 4,739,436 A | 4/1988 | Stefani et al. | | 361/56 |
| 5,115,368 A | 5/1992 | Smith | | 361/56 |
| 5,136,460 A | 8/1992 | Misencik et al. | | 361/117 |
| 5,488,534 A | 1/1996 | Rau et al. | | 361/56 |
| 5,502,612 A | 3/1996 | Osterhout et al. | | 361/117 |
| 5,774,315 A | 6/1998 | Mussenden | | 361/18 |
| 5,854,730 A | 12/1998 | Mitchell et al. | | 361/38 |
| 5,956,223 A | 9/1999 | Banting | | 361/117 |
| 5,978,198 A | 11/1999 | Packard et al. | | 361/111 |
| 6,040,972 A | * 3/2000 | Takeuchi | | 361/119 |
| 6,266,223 B1 | * 7/2001 | Curry | | 361/119 |
| 6,377,435 B1 | * 4/2002 | Nabell et al. | | 361/119 |
| 6,430,017 B1 | 8/2002 | Finlay, Sr. et al. | | 361/104 |
| 6,556,394 B1 | 4/2003 | Wilson | | 361/42 |
| 6,560,086 B2 | 5/2003 | Mechanic | | 361/111 |
| 2002/0048130 A1 | 4/2002 | Jakwani et al. | | 361/118 |

FOREIGN PATENT DOCUMENTS

JP 3-212154 A2 9/1991

* cited by examiner

*Primary Examiner*—Ronald Leja
(74) *Attorney, Agent, or Firm*—Paul F. Donovan

(57) ABSTRACT

A dual stage current limiting surge protector system for protecting telecommunications equipment from power and surge transients is provided. The surge protector system includes a voltage suppressor having first and second ends operatively coupled between input tip and ring terminal pins. The first and second ends of the voltage suppressor are also operatively coupled between output tip and ring terminal pins. First and second current limiting devices are interconnected between the input tip and ring terminal pins and the respective first and second ends of the voltage suppressor. Third and fourth current limiting devices are interconnected between the output tip and ring terminal pins and the respective first and second ends of the voltage suppressor.

8 Claims, 2 Drawing Sheets

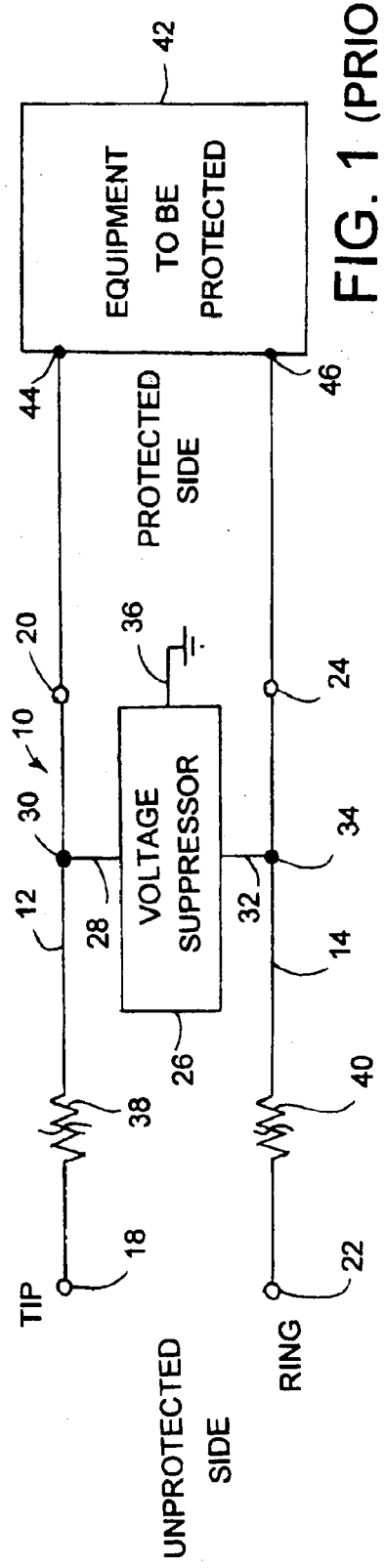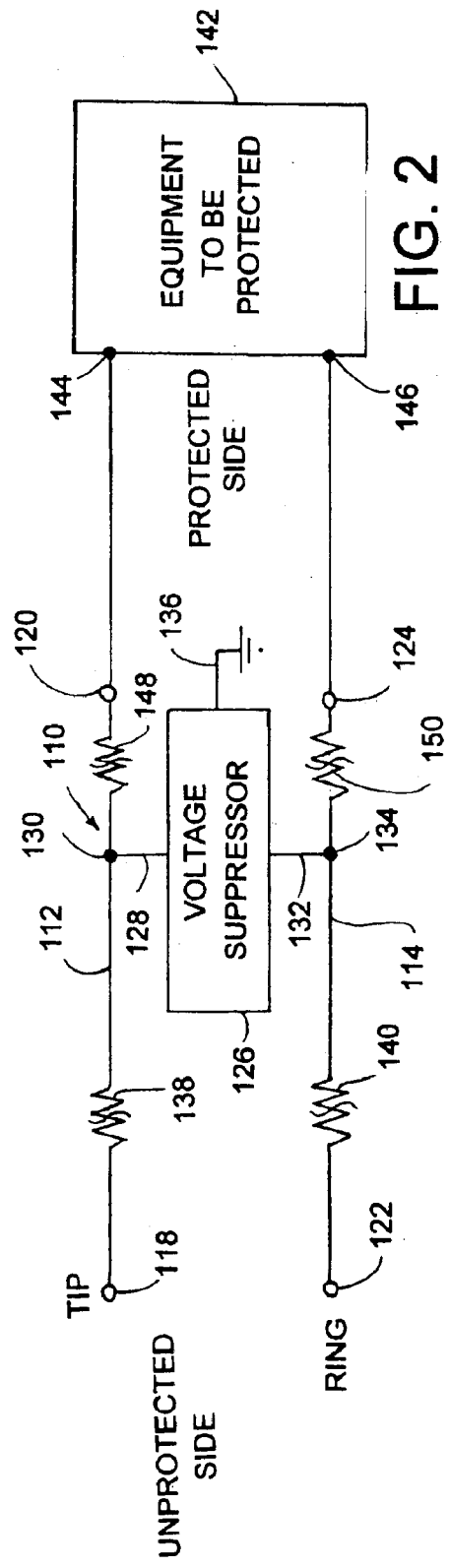

DUAL STAGE CURRENT LIMITING SURGE PROTECTOR SYSTEM

BACKGROUND OF THE INVENTION

1. Field of the Invention

This invention relates generally to surge protection devices for protecting telephone communications related equipment from power and transient surges. More particularly, the present invention relates to an improved dual stage current limiting surge protector system for protecting telecommunication equipment from power and transient surges occurring on the tip and/or ring conductors of transmission lines connected thereto. Specifically, the dual stage current limiting surge protector system of the instant invention includes a first pair of current limiting devices connected in series between corresponding input tip and ring terminal pins and opposite ends of a voltage suppressor and a second pair of current limiting devices connected in series between corresponding output tip and ring terminal pins and the opposite ends of the voltage suppressor.

2. Description of the Prior Art

As is generally well-known to those skilled in the telecommunications industry, modern telecommunications equipment is susceptible to transient surges such as those caused by lightning strikes and other voltage surges on the transmission lines. Accordingly, various types of surge protector circuits are known in the prior art which have been provided for connection to the incoming transmission lines so as to be normally non-operative but are rendered active when a voltage/current surge exceeds a predetermined limit for protecting the sensitive equipment.

A prior art search directed to the subject matter of this application in the U.S. Patent and Trademark Office revealed the following Letters Patent and application:

| | |
|---|---|
| 4,587,588 | 5,854,730 |
| 4,739,436 | 5,956,223 |
| 5,115,368 | 5,978,198 |
| 5,136,460 | 6,430,198 |
| 5,488,534 | 6,556,394 |
| 5,502,612 | 6,560,086 |
| 5,774,315 | |

Japanese Patent No. 3,212,154 and U.S. Publication No. 2002/0048130.

In U.S. Pat. No. 4,587,588 to Richard Goldstein issued on May 6, 1986, there is disclosed a power line transient surge suppressor circuit which includes a fuse inserted in series with a surge-bypassing network in which the fuse blows in the event of a short-circuit failure of a regulator device in the network. A thermal cut-out is inserted in series with the suppressor circuit input. A current-limiting heater resistor is connected in parallel with the fuse and supplies heat to trip the thermal cut-out after the fuse blows, thereby terminating power output to the loads.

In U.S. Pat. No. 4,739,436 to Joseph P. Stefani et al. issued on Apr. 19, 1988, there is disclosed a voltage suppression circuit which employs two series connected metal oxide varistors and a power interrupter to provide suppression of all modes of voltage surge while providing protection against failure of either metal oxide varistor. The power interrupter consists of a current-limiting fuse.

U.S. Pat. No. 5,502,612 to Joseph c. Osterhout et al. issued on Mar. 26, 1996 teaches a secondary surge arrestor which includes a nonlinear voltage dependent resistive element and a fault current limiting fuses connected between the conductors and disposed within the casing. The fault current limiting fuse is formed of a fusible material surrounded by sand.

U.S. Pat. No. 6,430,017 to David A. Finlay, Sr. et al. issued on Aug. 6, 2002, teaches a transient voltage suppressor for an electrical circuit which includes a metal oxide varistor connected in series with a thermally responsive fuse and a current limiting fuse, all joined between hot and neutral conductors. A load is also connected between the hot and neutral conductors.

The remaining patents, listed above but not specifically discussed, are deemed to be only of general interest and show the state of the art in transient and voltage surge protection systems for preventing damage to electrical equipment.

Further, there is shown in FIG. 1 a prior art surge protector circuit that is also known to the applicant of the present invention. The surge protector circuit is comprised of a voltage suppressor and a pair of current limiting devices connected in series with the opposite ends of the voltage suppressor. Such prior art surge protector circuit of this type is required to meet or pass the primary test according to the specification set forth by UL Standards 497 and 497A. However, in order to accommodate the UL test where high rated level of current must be allowed to pass through the current limiting devices, the current limiting devices are selected to have a relatively high rated value, such as 350 ma for fuses or 160 ma for positive thermal coefficient (PTC) resistors. Unfortunately, the use of the current limiting devices having these high values can cause damage to some sensitive equipment during normal operating conditions when such high level currents are allowed to pass therethrough.

None of the prior art discussed above disclosed a dual stage current limiting surge protector system like that of the present invention which includes a first pair of current limiting devices, a voltage suppressor, and a second pair of current limiting devices. As a result, the instant surge protector system passes the primary test of the UL Standards 497 and 497A and still protects sensitive equipment from being damaged.

SUMMARY OF THE INVENTION

Accordingly, it is a general object of the present invention to provide a dual stage current limiting surge protector system for protecting telecommunication equipment from power and transient surges which is relatively simple and economical to manufacture and assemble.

It is an object of the present invention to provide a dual stage current limiting surge protector system which meets the specifications set forth by UL Standards 497 and 497A but yet prevents high current levels from reaching sensitive equipment being protected.

It is still another object of the present invention to provide a dual stage current limiting surge protector system which includes a first pair of current limiting devices, a voltage suppressor, and a second pair of current limiting devices.

It is still yet another object of the present invention to provide a dual stage current limiting surge protector system which is characterized by a design wherein a second pair of current limiting devices have lower current rated values than a first pair of current limiting devices.

In a preferred embodiment of the present invention, there is provided a dual stage current limiting surge protector system for protecting telecommunications equipment and the like from power and transient surges which includes a voltage suppressor having first and second ends operatively coupled between input tip and ring terminal pins. The first and second ends of the voltage suppressor are also operatively coupled between output tip and ring terminal pins. First and second current limiting devices are interconnected between the input tip and ring terminal pins and the respective first and second ends of the voltage suppressor. Third and fourth current limiting devices are interconnected between the output tip and ring terminal pins and the respective first and second ends of the voltage suppressor.

BRIEF DESCRIPTION OF THE DRAWINGS

These and other objects and advantages of the present invention will become more fully apparent from the following detailed description when read in conjunction with the accompanying drawings with like reference numerals indicating corresponding parts throughout, wherein:

FIG. 1 is a schematic circuit diagram of a prior art surge protector circuit;

FIG. 2 is a schematic circuit diagram of a dual stage current limiting surge protector system, constructed in accordance with the principles of the present invention.

DESCRIPTION OF THE PREFERRED EMBODIMENTS

Figure 3:
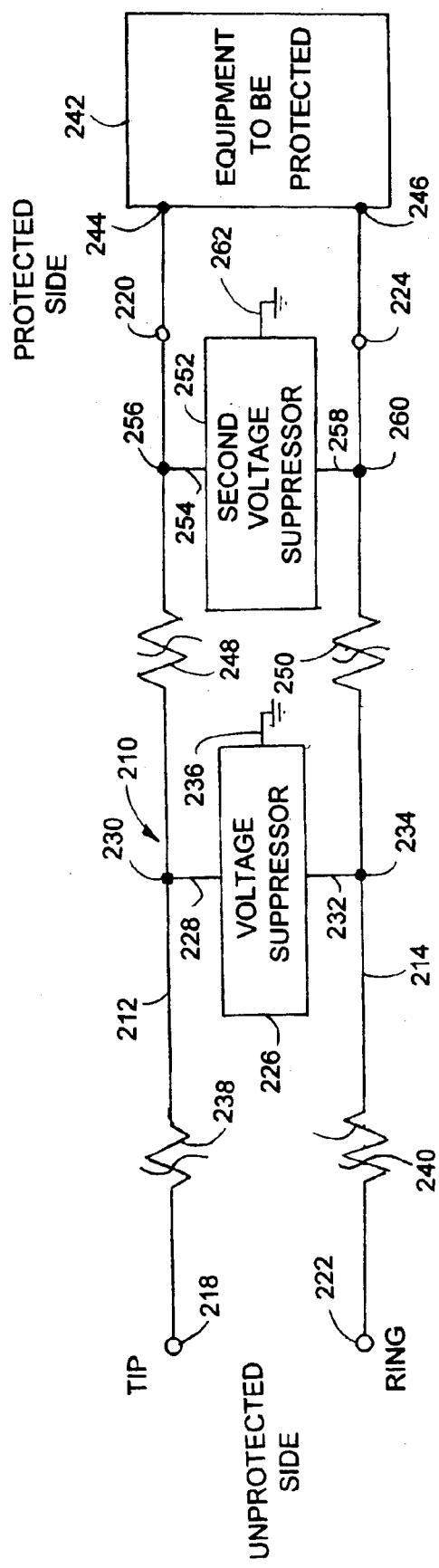
FIG. 3 is a schematic circuit diagram of a second embodiment of a dual stage current limiting surge protector system in accordance with the present invention.

It is to be distinctly understood at the outset that the present invention shown in the drawings and described in detail in conjunction with the preferred embodiments is not intended to serve as a limitation upon the scope or teachings thereof, but is to be considered merely as an exemplification of the principles of the present invention.

Referring now in detail to the drawings, there is illustrated in FIG. 1 a schematic system diagram of a prior art surge protector 10 for protecting telecommunications equipment from power and transient surges occurring on tip and/or ring conductors of transmission lines connected thereto. The surge protector circuit 10 is comprised of first and second data signal conductors 12 and 14. One end of the first conductor 12 is coupled to an input tip terminal pin 18 and its other end thereof is coupled to an output tip terminal pin 20. Similarly, one end of the second conductor 14 is coupled to an input ring terminal pin 22 and its other end is coupled to an output ring terminal pin 24. The input or unprotected side of the surge protector circuit 10 is connectable to a pair of incoming telephone lines via the input tip and ring terminal pins 18, 22. The output or protected side of the surge protector circuit 10 is connectable between two wires at respective nodes 44, 46 of individual telephone equipment 42 to be protected via the output tip and ring terminal pins 20, 24.

The surge protector circuit 10 includes a voltage suppressor 26 having a first lead 28 connected to the first conductor 12 at an internal node 30 and a second lead 32 connected to the second conductor 14 at an internal node 34. A third lead 36 of the voltage suppressor 26 is connected to a ground potential. A first current limiting device 38 in the form of a fuse element or positive thermal coefficient (PTC) resistor is interconnected between the input tip terminal pin 18 and the internal node 30. A second current limiting device 40 in the form of a fuse element or positive thermal coefficient (PTC) resistor is interconnected between the input ring terminal pin 22 and the internal node 34.

As previously pointed out, in the surge protector circuit 10 the current limiting devices 38, 40 have relatively high rated current levels (e.g., 350 ma for fuses or 160 ma for PTC resistors) in order to meet the specification set forth by UL Standards 497 and 497A. As a consequence, the surge protector circuit 10 suffers from the disadvantage that these high rated values for the current limiting devices can cause damage to some sensitive equipment during normal operating conditions when such high level currents are allowed to be passed therethrough.

In order to overcome all of the problems associated with the surge protector circuit of FIG. 1 but yet still pass the primary test according to the specifications set forth by UL Standards 497 and 497A and further prevents high currents from reaching the sensitive equipment, the inventor of the present invention has developed a dual stage current limiting surge protector system which includes a first pair of current limiting devices, a voltage suppressor, and a second pair of current limiting devices.

With reference now to FIG. 2 of the drawings, there is depicted a schematic circuit diagram of a dual stage current limiting surge protector system 110 for protecting telecommunications equipment from power and transient surges occurring on tip and/or ring conductors of transmission lines connected thereto, constructed in accordance with the principles of the present invention. The surge protector system 110 is comprised of first and second data signal conductors 112 and 114. One end of the first conductor 112 is coupled to an input tip terminal pin 118 and its other end thereof is coupled to an output tip terminal pin 120. Similarly, one end of the second conductor 114 is coupled to an input ring terminal pin 122 and its other end is coupled to an output ring terminal pin 124. The input or unprotected side of the surge protector system 110 is connectable to a pair of incoming telephone lines via the input tip and ring terminal pins 118, 122. The output or protected side of the surge protector system 110 is connectable between two wires at respective nodes 144, 146 of individual telephone equipment 142 to be protected via the output tip and ring terminal pins 120, 124.

The surge protector system 110 includes a voltage suppressor 126 having a first lead 128 connected to the first conductor 112 at an internal node 130 and a second lead 132 connected to the second conductor 114 at an internal node 134. A third lead 136 of the voltage suppressor 126 is connected to a ground potential. A first current limiting device 138 in the form of a fuse element or positive thermal coefficient (PTC) resistor is interconnected between the input tip terminal pin 118 and the internal node 130. A second current limiting device 140 in the form of a fuse element or positive thermal coefficient (PTC) resistor is interconnected between the input ring terminal pin 122 and the internal node 134. As thus far described, the dual stage current limiting surge protector system 110 is identical to the surge protector circuit 10 of FIG. 1.

The voltage suppressor 126 may be formed of a silicon avalanche suppressor (SAS), sidactor, gas discharge tube or other similar devices which have predetermined breakdown voltages that are relatively high, preferably in the range of approximately 200–600 volts. In the preferred embodiment, the voltage suppressor 126 is a silicon avalanche suppressor similar to type 1.5 KE.

The improvement of the present invention resides in the addition of third and fourth current limiting devices 148,

150. The third current limiting device 148 is in the form of a fuse element or positive thermal coefficient (PTC) resistor interconnected between the internal node 130 and the output tip terminal pin 120 which is joined to the node 144 of the equipment 142 to be protected. The fourth current limiting device 150 is in the form of a fuse element or positive thermal coefficient (PTC) resistor interconnected between the internal node 134 and the output ring terminal pin 124 which is joined to the node 146 of the equipment 142 to be protected.

The third and fourth current limiting devices 148, 150 are each selected to have a rated current value which is substantially less than the rated current value of the first and second current limiting devices 138, 140. In particular, when the first and second current limiting devices 138, 140 are fuse elements having a rated current value of 350 ma then the third and fourth current limiting devices 148, 150 will be selected to be fuse elements having a rated current value of about 175 ma. If the first and second current limiting devices are PTC resistors having a rated current value of 160 ma then the third and fourth current limiting devices will be selected as PTC resistors having a rated current value of about 80 ma.

In operation, during normal conditions the first through fourth current limiting devices 138, 140, 148, and 150 will all be conducting so as to allow the current to flow to the equipment 142. However, upon experiencing a current surge which exceeds the rated current value of the third and fourth current limiting devices 148 and 150, these devices will "blow" initially since they have a lower rated current value than the first and second current limiting devices 138 and 140, thereby protecting the equipment from damage.

With reference now to FIG. 3 of the drawings, there is illustrated a second embodiment of a schematic circuit diagram of a dual stage current limiting surge protector system 210 for protecting telecommunications equipment from power and transient surges occurring on tip and/or ring conductors of transmission lines connected thereto in accordance with the present invention. The surge protector system 210 is comprised of first and second data signal conductors 212 and 214. One end of the first conductor 212 is coupled to an input tip terminal pin 218 and its other end thereof is coupled to an output tip terminal pin 220. Similarly, one end of the second conductor 214 is coupled to an input ring terminal pin 222 and its other end is coupled to an output ring terminal pin 224. The input or unprotected side of the surge protector system 210 is connectable to a pair of incoming telephone lines via the input tip and ring terminal pins 218, 222. The output or protected side of the surge protector system 210 is connectable between two wires at respective nodes 244, 246 of individual telephone equipment 142 to be protected via the output tip and ring terminal pins 220, 224.

The surge protector system 210 includes a voltage suppressor 226 having a first lead 228 connected to the first conductor 212 at an internal node 230 and a second lead 232 connected to the second conductor 214 at an internal node 234. A third lead 236 of the voltage suppressor 226 is connected to a ground potential. A first current limiting device 238 in the form of a fuse element or positive thermal coefficient (PTC) resistor is interconnected between the input tip terminal pin 218 and the internal node 230. A second current limiting device 240 in the form of a fuse element or positive thermal coefficient (PTC) resistor is interconnected between the input ring terminal pin 222 and the internal node 234.

The voltage suppressor 226 may be formed of a silicon avalanche suppressor (SAS), sidactor, gas discharge tube or other similar devices which have predetermined breakdown voltages that are relatively high, preferably in the range of approximately 200–600 volts. In the preferred embodiment, the voltage suppressor 226 is a silicon avalanche suppressor similar to type 1.5 KE.

In addition, there are provided third and fourth current limiting devices 248, 250. The third current limiting device 248 is in the form of a fuse element or positive thermal coefficient (PTC) resistor interconnected between the internal node 230 and the output tip terminal pin 220 which is joined to the node 244 of the equipment 242 to be protected. The fourth current limiting device 250 is in the form of a fuse element or positive thermal coefficient (PTC) resistor interconnected between the internal node 234 and the output ring terminal pin 224 which is joined to the node 246 of the equipment 242 to be protected. As thus far described, the dual stage current limiting surge protector system 210 is identical to the surge protector circuit 110 of FIG. 2.

The third and fourth current limiting devices 248, 250 are each selected to have a rated current value which is substantially less than the rated current value of the first and second current limiting devices 238, 240. In particular, when the first and second current limiting devices 238, 240 are fuse elements having a rated current value of 350 ma then the third and fourth current limiting devices 248, 250 will be selected to be fuse elements having a rated current value of about 175 ma. If the first and second current limiting devices are PTC resistors having a rated current value of 160 ma then the third and fourth current limiting devices will be selected as PTC resistors having a rated current value of about 80 ma.

Further, there is provided a second voltage suppressor 252 connected across the output tip and ring terminal pins 220 and 224. In particular, the second voltage suppressor 252 has a first lead 254 connected to the output tip terminal pin 220 at an internal node 256 and a second lead 258 connected to the output ring terminal pin 224 at an internal node 260. A third lead 262 of the second voltage suppressor 252 is connected to a ground potential. The second voltage suppressor 252 may also be formed of a silicon avalanche suppressor (SAS), sidactor, gas discharge tube or other similar device which has a predetermined breakdown voltage that is less than the breakdown voltage of the voltage suppressor 226.

In operation, during normal conditions the first through fourth current limiting devices 238, 240, 248, and 250 will all be conducting and the voltage suppressors 226, 252 will be non-conductive so as to allow the current to flow to the equipment 242. When a voltage surge exceeds the lower breakdown voltage of the second voltage suppressor 252, it will be rendered conductive so as to protect the equipment 242 from over-voltage. This will cause the current flowing through the third and fourth current limiting devices 248, 250 to increase and thus increases its resistance. As a result, these devices will react much quicker and "blow" when the surge current is exceeded so as to protect the equipment 242 from over-current.

From the foregoing detailed description, it can thus be seen that the present invention provides a dual stage current limiting surge protector system for protecting telecommunication equipment and the like from power surges which includes a first pair of current limiting devices connected in series between corresponding input tip and ring terminal pins and opposite ends of a voltage suppressor and a second pair of current limiting devices connected in series between corresponding output tip and ring terminal pins and the opposite ends of the voltage suppressor. The second pair of current limiting devices have rated current values which are less than the first pair of current limiting devices. As a result, the dual stage current limiting system will pass the primary test according to the specifications set forth by UL Standards 497 and 497A and yet still protect the sensitive equipment from being damaged.

While there has been illustrated and described what is at present considered to be a preferred embodiment of the present invention, it will be understood by those skilled in the art that various changes and modifications may be made, and equivalents may be substituted for elements thereof without departing from the true scope of the invention. In addition, many modifications may be made to adapt a particular situation or material to the teachings of the invention without departing from the central scope thereof. Therefore, it is intended that this invention not be limited to the particular embodiment disclosed as the best mode contemplated for carrying out the invention, but that the invention will include all embodiments falling within the scope of the appended claims.

I claim:

1. A dual stage current limiting surge protector system for protecting telecommunications equipment from power and transient surges, comprising:

input tip and ring terminal pins;

output tip and ring terminal pins;

first voltage suppressor means having first and second ends operatively coupled between said input tip end ring terminal pins;

the first and second ends of said first voltage suppressor means being also operatively coupled between said output tip and ring terminal pins;

first and second fuse elements interconnected between said input tip and ring terminal pins and the respective first and second ends of said first voltage suppressor means;

equipment to be protected being coupled to said output tip and ring terminals;

third and fourth current fuse elements interconnected between said output tip and ring terminal pins and the respective first and second ends of said first voltage suppressor means;

each of said third and fourth fuse elements having a lower rated current value than each of said first and second fuse elements;

said first and second fuse elements having a relatively high rated current value of about 350 ma in order to allow passing a UL standard test;

said third and fourth fuss elements having a relatively low rate current value of about 175 ma in order to protect said equipment coupled to said output tip and ring terminal pins from being damaged;

second voltage suppressor means having first and second ends operatively coupled between said output tip and ring terminal pins; and said second voltage suppressor means having a predetermined breakdown voltage that is less that the breakdown voltage of said first voltage suppressor means.

2. A dual stage current limiting surge protector system as claimed in claim 1, wherein said voltage suppressor means is comprised of a silicon avalanche suppressor.

3. A dual stage current limiting surge protector system as claimed in claim 1, wherein said voltage suppressor means is comprised of a sidactor.

4. A dual stage current limiting surge protector system as claimed in claim 1, wherein said voltage suppressor means is comprised of a gas discharge tube.

5. A dual stage current limiting surge protector system for protecting telecommunications equipment from power and transient surges, comprising:

input tip and ring terminal pins;

output tip and ring terminal pins;

first voltage suppressor means having first and second ends operatively coupled between said input tip and ring terminal pins;

the first and second ends of said first voltage suppressor means being also operatively coupled between said output tip and ring terminal pins;

first and second positive thermal coefficient resistors interconnected between said input tip and ring terminal pins and the respective first and second ends of said first voltage suppressor means;

equipment to be protected being coupled to said output tip and ring terminals;

third and fourth positive thermal coefficient resistors interconnected between said output tip and ring terminal pins and the respective first and second ends of said first voltage suppressor means;

each of said third and fourth positive thermal coefficient resistors having a lower rated current value than each of said first and second positive thermal coefficient resistors;

said first and second positive thermal coefficient resistor having a relatively high rated current value of about 160 ma in order to allow passing a UL standard test;

said third and fourth positive thermal coefficient resistors having a relatively low rated current value of about 80 ma in order to protect said equipment coupled to said output tip and ring terminal pins from being damaged;

second voltage suppressor means having first and second ends operatively coupled between said output tip and ring terminal pins; and said second voltage suppressor means having a predetermined breakdown voltage that is less that the breakdown voltage of said first voltage suppressor means.

6. A dual stage current limiting surge protector system as claimed in claim 5, wherein said voltage suppressor means is comprised of a silicon avalanche suppressor.

7. A dual stage current limiting surge protector system as claimed in claim 5, wherein said voltage suppressor means is comprised of a sidactor.

8. A dual stage current limiting surge protector system as claimed in claim 5, wherein said voltage suppressor means is comprised of a gas discharge tube.

* * * * *